United States Patent [19]

Shimode et al.

[11] Patent Number: 4,763,135

[45] Date of Patent: Aug. 9, 1988

[54] THERMAL-HEAD RECORDING DEVICE AND METHOD

[75] Inventors: Shinichi Shimode, Ibaraki; Kastubumi Ouchi, Chigasaki, both of Japan

[73] Assignee: Hitachi, Ltd., Tokyo, Japan

[21] Appl. No.: 919,422

[22] Filed: Oct. 16, 1986

[30] Foreign Application Priority Data

Oct. 16, 1985 [JP] Japan .............................. 60-228612

[51] Int. Cl.[4] .......................... G01D 15/10; B41J 3/20

[52] U.S. Cl. ................................ 346/1.1; 346/76 PH; 400/120; 400/240.1

[58] Field of Search .................. 346/76 PH; 400/120, 400/240.1; 430/348

[56] References Cited

U.S. PATENT DOCUMENTS 4,250,511 2/1981 Stein et al. .................... 346/76 PH
4,376,942 3/1983 Toth et al. .................... 346/76 PH
4,614,950 9/1986 Ito ................................ 346/76 PH

FOREIGN PATENT DOCUMENTS 58-118277 7/1983 Japan .
59-214373 12/1984 Japan .

*Primary Examiner*—E. A. Goldberg
*Assistant Examiner*—Gerald E. Preston
*Attorney, Agent, or Firm*—Antonelli, Terry & Wands

[57] ABSTRACT

A low-noise, small-sized and inexpensive thermal-head type recording device. The timing of the signal for commencing the driving of a paper feed motor is delayed by a predetermined period, e.g., 5 to 20 mS, after the signal for commencing one-line recording by the thermal head, thereby minimizing the force required for separating the sticking recording paper sheet from the thermal head.

8 Claims, 7 Drawing Sheets

THERMAL-HEAD RECORDING DEVICE AND METHOD

BACKGROUND OF THE INVENTION

The present invention relates to a thermal-head type recording device for use in, for example, facsimile apparatus and, more particularly, to a thermal-head type recording device which can reduce the level of noise and the load on the paper feeding motor.

The specification of the U.S. Pat. No. 4,250,511 discloses a recording device which incorporates a thermal head for thermally recording information. This device is widely used in facsimile and other apparatus because it does not necessitate any developing and fixing mechanism. These apparatus are finding spreading use in ordinary offices, in compliance with current demands for automation in office works. On the other hand, there is an increasing demand for development of machines which can operate with reduced level of noise and which are inexpensive. Generally, the noises in thermal recording devices of the type described are caused by the paper feeding motor, as well as by sticking and separation of the paper to and from the thermal head.

Under these circumstances, Japanese Patent Unexamined Publication No. 214373/1984 proposes a thermal recording device in which measures are taken for absorbing and insulating noise around the thermal head and the paper outlet section of the device. Unfortunately, however, no proposal has been made up to now for a technic which would suppress the generation of noise in a thermal recording device of the kind described.

SUMMARY OF THE INVENTION

Accordingly, an object of the present invention is to provide a thermal recording device in which the generation of noise caused by sticking and separation of the paper to and from the thermal head is suppressed so as to reduce the level of the noise during the operation of the device.

Another object of the invention is to provide a thermal recording device in which a small-sized and inexpensive paper feeding motor is used so as to reduce the power consumption and the cost of the device, while contributing to a further reduction of the noise.

To these ends, according to one aspect of the invention, there is provided a thermal-head type recording device including a thermal head having a multiplicity of heat-generating elements arrayed thereon, a recording paper sheet adapted to be fed in a direction perpendicular to the direction of the array of the heat-generating elements, and a paper feeding motor for feeding the recording paper sheet in the direction, comprising: controlling means for causing the timing of a signal for commencing the driving of the paper feeding motor to be delayed by a predetermined period behind the timing of the signal for commencing the recording by the thermal head for each recording line.

According to another aspect of the invention, there is provided a thermal-head type recording device including a thermal head having a multiplicity of heat-generating elements arrayed thereon, a recording paper sheet adapted to be fed in a direction perpendicular to the direction of the array of the heat-generating elements, and a paper feeding motor for feeding the recording paper sheet in the direction, comprising: means for supplying, when the feed of the recording paper sheet has been suspended for a predetermined period after the recording operation of the thermal head by heating pulses supplied thereto, heating pulses to the heat-generating elements which have participated in the recording operation, immediately before the commencement of the feed of the recording paper sheet after the suspension of feed thereof.

According to still another aspect of the invention, there is provided a thermal-head type recording method in which a recording paper sheet is fed in a direction perpendicular to the direction of array of multiplicity of heat-generating elements on a thermal head, and video information is recorded on the recording paper sheet in accordance with heating pulses supplied to the heat-generating elements, characterized by causing the timing of a signal for commencing the driving of the paper feeding motor to be delayed by a predetermined period behind the timing of the signal for commencing the recording by the thermal head for each recording line.

According to a further aspect of the invention, there is provided a thermal-head type recording method in which a recording paper sheet is fed in a direction perpendicular to the direction of array of a multiplicity of heat-generating elements on a thermal head, and video information is recorded on the recording paper sheet in accordance with heating pulses supplied to the heat-generating elements, characterized by causing the timing for commencing the feeding of the recording paper sheet is delayed by a predetermined period behind the timing for commencing the recording on the recording paper sheet, and supplying, when the feed of the recording paper sheet has been suspended for a predetermined period after a recording operation on the recording paper sheet, heating pulses to the heat-generating elements which have participated in the recording operation, immediately before the commencement of the feed of the recording paper sheet after the suspension of feed thereof.

These and other objects, features and advantages of the invention will become clear from the following description of the preferred embodiment when the same is read in conjunction with the accompanying drawings.

DESCRIPTION OF THE PREFERRED EMBODIMENT

Figure 1:
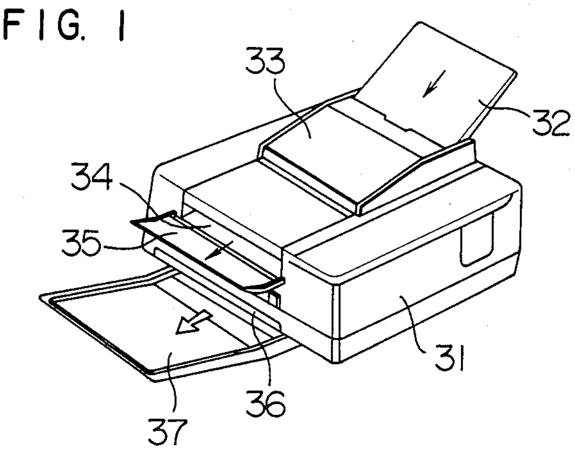
FIG. 1 is a schematic illustration of a facsimile apparatus as an embodiment of the invention.

FIG. 1 schematically shows a facsimile apparatus as an embodiment of the thermal recording device in accordance with the present invention. This embodiment has a housing 31 the space in which is divided into two sections: namely, an upper section constituting an original reading (transmitting) section and a lower section constituting a signal receiving (recording) section. FIG. 1 shows parts which are required only during transmission, e.g., an original mounting plate 32, a cover 33 of paper-feeding mechanism, an original entrance 34 and an original tray 35, as well as parts which are required only during receiving, e.g., a paper outlet 36 in the housing 31 and a recording paper tray 37. Parts other than the trays 35 and 37 are accomodated by the housing 31. In this Figure, a single-line arrow (←) represents the direction in which the original sheet is fed during transmission, while a double-line arrow (⇐) represents the direction in which the sheet after recording is discharged.

Figure 2:
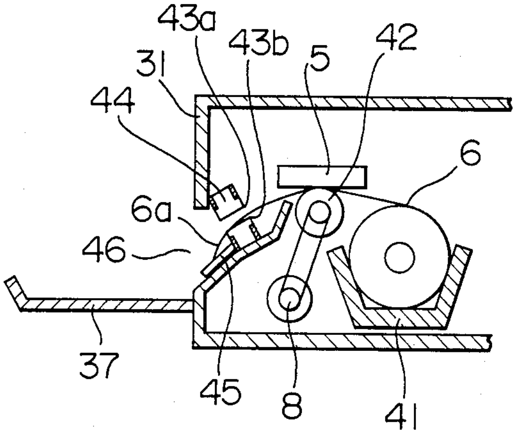
FIG. 2 is a sectional view of an essential portion of the recording portion of a thermal recording device of the present invention.

Referring now to FIG. 2 showing the recording section of the heat-sensitive recording device, a roll 6 of a specific recording paper sheet is set in a sheet holder 41 and is adapted to be extracted and fed by a platen roller 42 which in turn is driven by a pulse motor 8 which serves as a paper feeding motor. As the sheet of the recording paper is fed, received video information is recorded on the thermal head 5 which opposes to the platen roller 42 across the recording paper sheet. The sheet of the recording paper after the recording is discharged through the outlet 46 formed in the housing 31 along a path via the space between guide members 43*a* and 43*b* and the space between cooperating members of a cutter 44, past a guide member 45.

Figure 3:
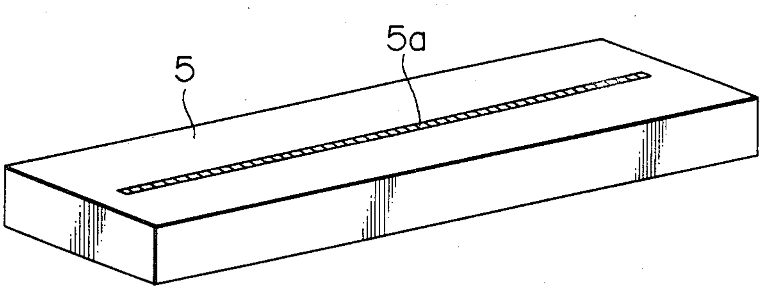
FIG. 3 is a perspective view of a thermal head in the thermal recording device shown in FIG. 2.

As will be understood from FIG. 3, the thermal head 5 has a multiplicity of heat-generating elements 5*a* arrayed in the longitudinal direction thereof. The sheet of the recording paper 6 is fed in the direction perpendicular to the direction of row of the heat-sensitive elements 5*a*.

Figure 4:
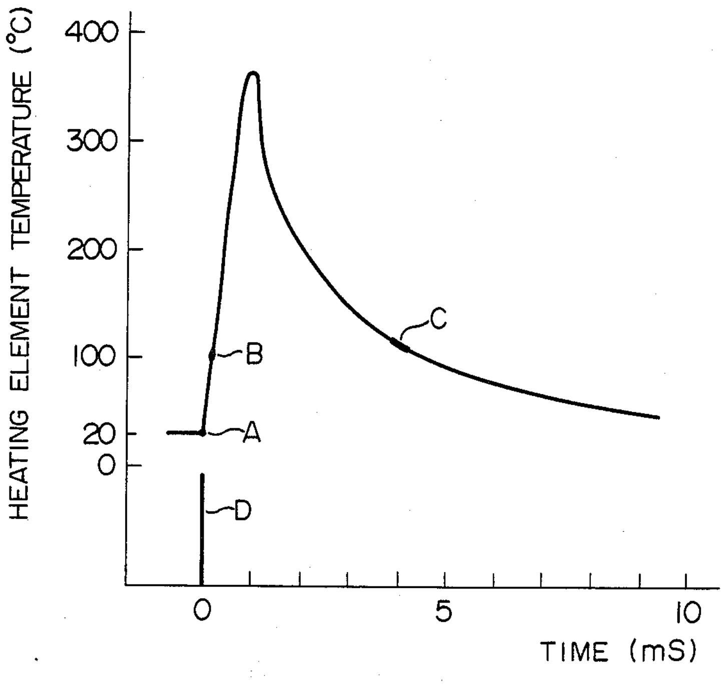
FIG. 4 is a chart showing a change in the temperature of the thermal head in relation to time during recording operation.

During the recording, each heat-generating element experiences a temperature change as shown in FIG. 4. The heat-generating element is abruptly heated as it receives a heating pulse signal at a moment A, and is then cooled gradually. Meanwhile, the temperature of the heat-sensitive layer on the recording paper sheet 6 facing this heat-generating element reaches the melting point at around a moment B and is lowered to a solidification point at a moment C so that the recording paper sheet produces a color, thus recording video information. During this operation, since the recording sheet of paper is heated to a temperature above the melting point, it is welded to the surface of the thermal head and is solidified thereon as the time lapses, thus exhibiting a sticking tendency to stick onto the surface of the thermal head. In this Figure, a symbol D represents a recording pulse signal.

The sticking force between the thermal head and the recording paper sheet is substantially in inverse proportion to the temperature of the surface of the thermal head. It is to be understood also that, in the conventional heat-sensitive recording device, the recording operation and the paper feeding operation are conducted simultaneously.

On the other hand, the recording operation is conducted by dividing a single recording line into a plurality of blocks, i.e., in a time-dividing manner, in order to reduce the size and capacity of the power supply for the recording. Therefore, the time length of the line feed is short as compared with the time length required for the recording of one line. In consequence, since the recording paper sheet is kept stationary during recording of at least one block in each line, the sticking of the recording paper sheet due to solidification inevitably takes place before the line feed for the recording on the next line.

Figure 5:
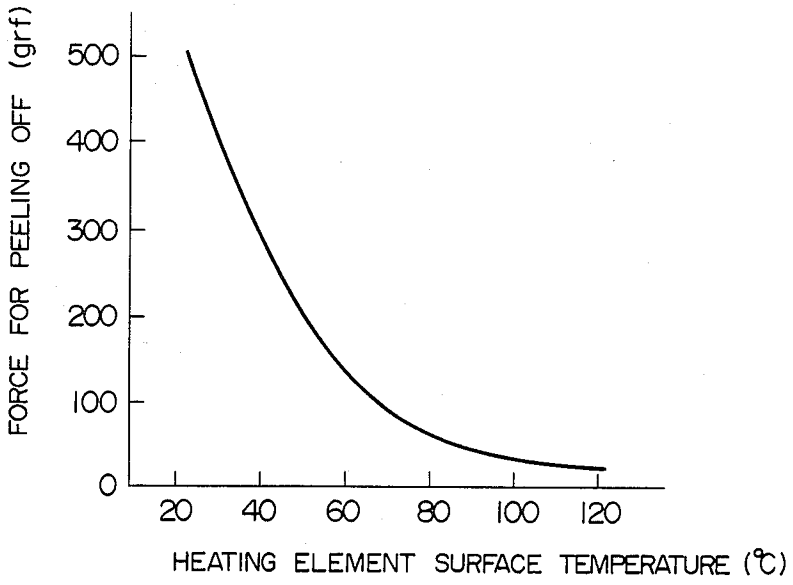
FIG. 5 is a diagram illustrating the temperature-dependency of the paper-separation force.

FIG. 5 shows the relationship as obtained between the temperature of the surface of the thermal head and the force required for separating the recording paper sheet from the thermal head.

It will be understood that the separation force is substantially in inverse proportion to the surface temperature of the thermal head. The separation of the recording paper sheet from the thermal head is effected by vibrating the recording paper sheet and the thermal head. This undesirably causes a very high noise.

Figure 6:
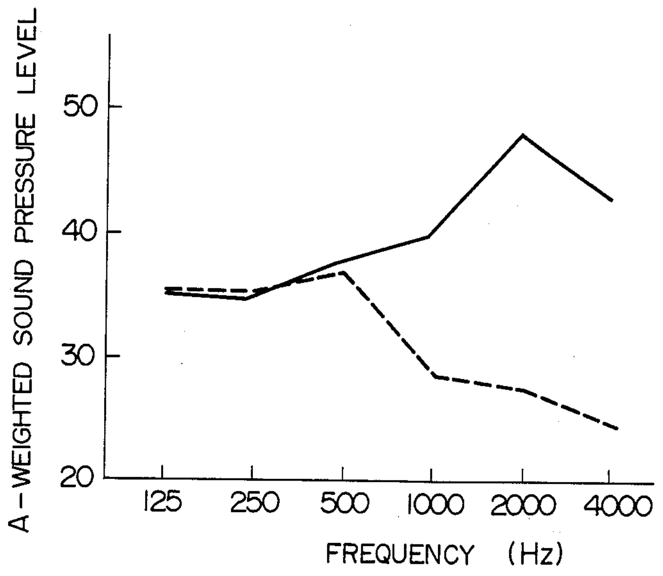
FIG. 6 is a diagram illustrating the result of frequency-analysis of the noise produced by a conventional thermal recording device.

FIG. 6 shows the result of a frequency-analysis conducted on the noise produced by a facsimile apparatus. More specifically, the broken-line curve shows a change in the driving noises such as the noise produced by the paper feeding motor, while a solid-line curve shows the change in the synthetic noise generated as a result of separation of the recording-paper sheet from the thermal head.

As will be seen from FIG. 6, the separation noise involves a major component in a high-frequency region above 1000 Hz, which is rather unpleasant. This noise is remarkable particularly when the ambient air temperature is low and when the paper feeding operation is commenced after a comparatively long suspension of recording operation, say 100 msec or longer, i.e., after a comparatively long cooling of the recording paper sheet. On the other hand, the force required for the separation of the recording paper sheet additionally loads the paper feeding motor, thus making it difficult to reduce the size and the price of the motor.

Figure 7:
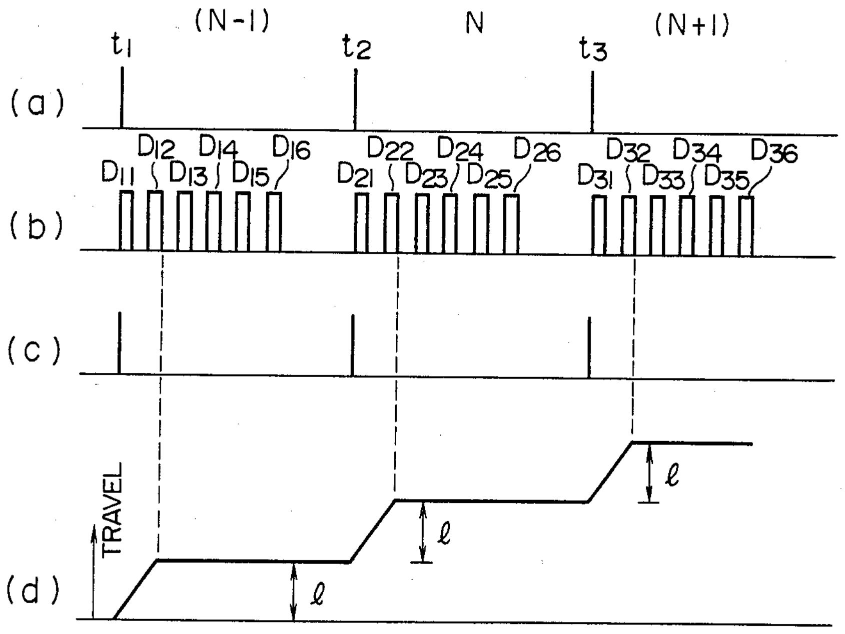
FIG. 7 is an illustration of the recording operation of the conventional thermal recording device.

FIG. 7 illustrates the recording operation and the paper feeding operation performed by a conventional thermal recording device of the kind described. Symbols $N-1$, $N$ and $N+1$ represent, respectively, the $(N-1)$th line, Nth line and the $(N+1)$th line of the recording. In order to reduce the capacity of the recording power supply, each line of recording is divided into a plurality of blocks (6 blocks in the illustrated case), i.e., a time-dividing recording system is adopted. It will be seen that the recording along each line of recording and the line feed of the recording paper sheet are commenced concurrently. More specifically, the moment $t_1$, $t_2$ and $t_3$ at which the recording is commenced as shown in (a) in FIG. 7 coincide with the timing shown in (d) in FIG. 7 at which the recording paper sheet is fed.

During recording along the Nth line for example, four blocks $D_{23}$, $D_{24}$, $D_{25}$ and $D_{26}$ are recorded while the recording paper sheet is kept stationary after having been fed by a distance l corresponding to the pitch of the recording lines. Therefore, the portions of the recording paper sheet corresponding to the blocks $D_{23}$ to $D_{26}$ are fused, welded and then solidified so as to completely stick to the surface of the thermal head, particularly when a long time is taken before the next line feed, i.e., when the recording speed is low due to high density of the recording. In consequence, a high level of noise is generated when the recording paper sheet is fed for the printing along the next line (N+1).

This problem, however, can be overcome by the present invention, as will be understood from the following description of a preferred embodiment taken in conjunction with FIGS. 8 to 14.

Figure 8:
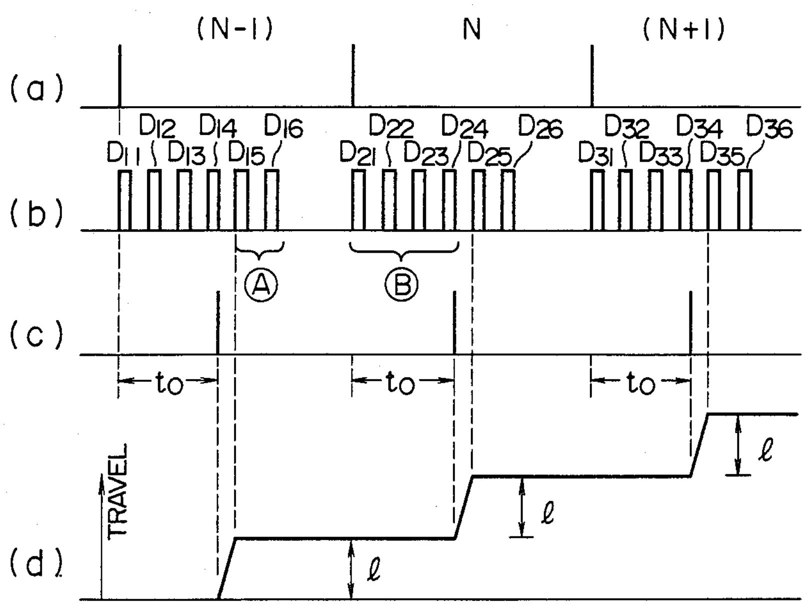
FIG. 8 is an illustration of the recording operation of an embodiment of the thermal recording device in accordance with the invention.

Referring first to FIG. 8 which shows the recording and paper feeding operation in an embodiment of the present invention, the recording along each line, e.g., the N th line, is commenced in response to the recording timing signal shown at (a) in FIG. 8 and is conducted in the time-dividing manner, i.e., by dividing one-line information into 6 blocks $D_{21}$ to $D_{26}$. A motor driving pulse is given at a moment which is $t_0$ after the commencement of the recording along the N th line, as shown at (c) in this Figure, so as to feed the recording paper sheet by a distance corresponding to the pitch of the recording lines. It is considered that the paper separation force produced at the moment of commencement of the paper feed accompanied by the vibration, is substantially proportional to the number of blocks of recorded information at which the recording paper sheet sticks to the thermal head. The blocks over which the sticking is taking place when the paper is fed during recording along the N th line includes the blocks $D_{15}$ and $D_{16}$ (region A) recorded after the (N−1)th feed and the blocks $D_{21}$, $D_{22}$, $D_{23}$ and $D_{24}$ (region B) recorded before the Nth feed of the recording paper sheet. Thus, the number of blocks over which the sticking is taking place is represented by A+B. As will be seen from FIG. 9, the number of the blocks included by the region A is in inverse proportion to the time lag $t_0$ of commencemnt of the paper feed, whereas the number of blocks included by the region A is proportional to the time lag $t_0$. Namely, the number of blocks in the region A is decreased whereas the number of blocks in the region B is increased, as the time lag $t_0$ is increased.

The noise characteristics as shown in FIG. 6 show that the separation force is minimized in a certain range of the time lag $t_0$.

An experiment was conducted in which the noise produced by the paper feeding motor and the noise produced as a result of separation of the recording paper sheet were measured while varying the time lag $t_0$ of the paper feed. From FIG. 10 which shows the result of this experiment, it will be seen that the noise produced by the separation of the recording paper is minimized when the time lag $t_0$ is 12 mS. In fact, the minimized separation noise is lower by 25 dB than that in the conventional thermal recording device in which the time lag $t_0$ is 0 (zero). Thus, the separation noise produced in the thermal recording device of the invention is about 1/300 that experienced with the conventional thermal recording device, in terms of the sound energy. It will be seen also that the noise level exhibits a drastic change when the time lag $t_0$ generally ranged between 5 mS and 20 mS.

In the embodiment described hereinbefore, the video information to be recorded in one line is divided into six blocks, and the line feed of the recording paper sheet is conducted in a single line-feed operation for each line of recording. The number of the blocks, however, may be changed, and the feed of the recording paper sheet may be conducted in a stepped manner, i.e., in several times, for each of the recording line.

Figure 10:
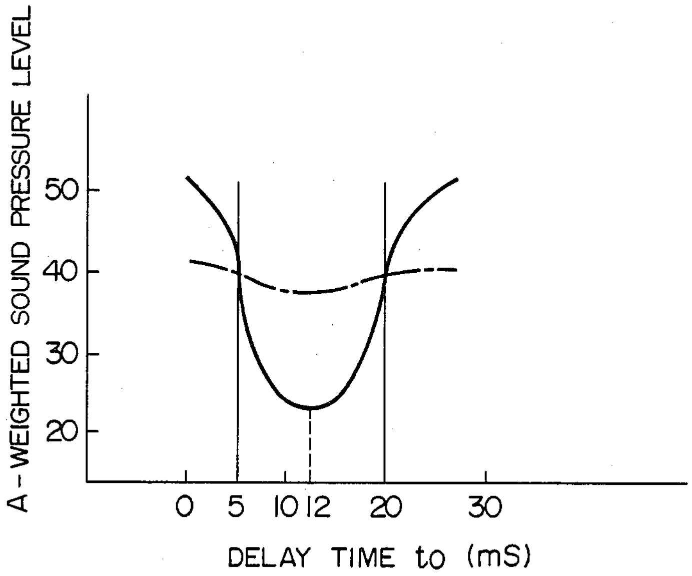
FIG. 10 is a graph illustrating the noise reduction effect produced by the embodiment of the invention.

The advantageous effect of the invention described hereinabove is remarkable particularly when the recording speed is low and when the ambient air temperature is low. Generally, however, a similar relationship between the noise level and the time lag $t_0$ is observed equally regardless of the conditions such as the recording speed and the ambient air temperature. In FIG. 10, a curve drawn by one-dot-and-dash line represents the level of the noise produced by the paper feeding motor.

The described embodiment of the invention can be carried out without substantial difficulty, by providing a circuit which delays the motor driving pulse by 5 to 20 mS. Such a circuit may be a very cheap circuit constructed in a single IC chip.

Figure 11:
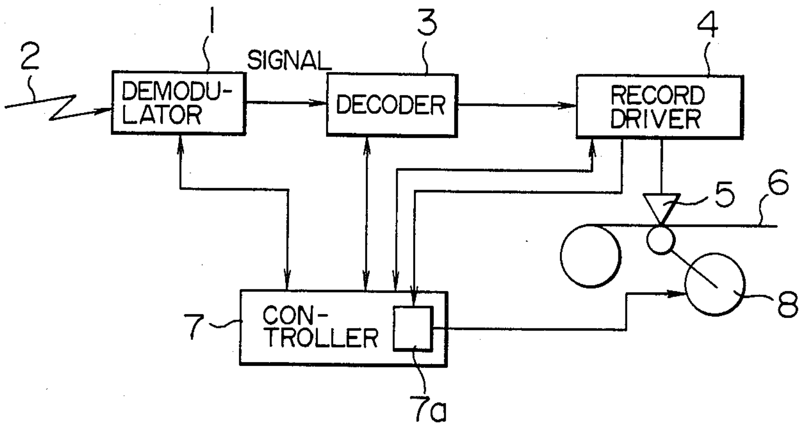
FIG. 11 is a block diagram of a practical example of the signal receiving section of a facsimile apparatus embodying the present invention.

FIG. 11 illustrates a practical example of a facsimile apparatus of thermal-head type to which the present invention is applied. This facsimile apparatus has a demodulator 1 which demodulates a modulated video single transmitted through a telephone circuit from another facsimile station, so as to produce a digital video signal which may be, for example, MH (Modified Huffman) code signal in case of a GIII class facsimile apparatus which meets the international standard. A decoder 3 decodes this MH signal into video signal.

A recording driver 4 drives, upon receipt of the video signal, the thermal head 5 so as to record the video signal on the recording paper sheet 6.

The facsimile apparatus has a control section 7 which administrates the timing of the whole apparatus, and determines the timing of generation of the video signal, as well as the timing of generation of the recording pulse (heating pulse) delivered to the recording driver 4 and the timing of generation of the pulse for driving the paper feeding pulse motor 8.

The control section 7 incorporates a delay circuit 7*a* which is adapted to cause the timing of generation of the motor driving pulse to be delayed by a period $t_0$ (see FIG. 8) after the timing of commencement of the recording of each line. Thus, the delay circuit 7*a* delivers the driving pulse to the pulse motor 8 at a timing which is delayed by $t_0$ after the receipt of the signal from the recording driver 4. As stated before, the dealy time $t_0$ is selected to range between 5 and 20 mS.

The timing of generation of the video signal largely varies depending on the quantity of information carried by the video signal. For instance, in case of an MH-coded thermal type facsimile apparatus meeting the international standard, the minimum transmission time is 20 mS per line at a transmission speed of 4800 bps with 1728 picture elements per line. In this apparatus, the time length required for transmission of one-line video information varies within the range of between 20 mS and 1.08 S. The control section 7 in the device of the present invention, therefore, has a function for effecting a duplicate printing when the interval of driving of the pulse motor 8 is longer than a predetermined period.

A description will be made hereinunder as to the manner in which the duplicate printing is controlled.

Figure 12:
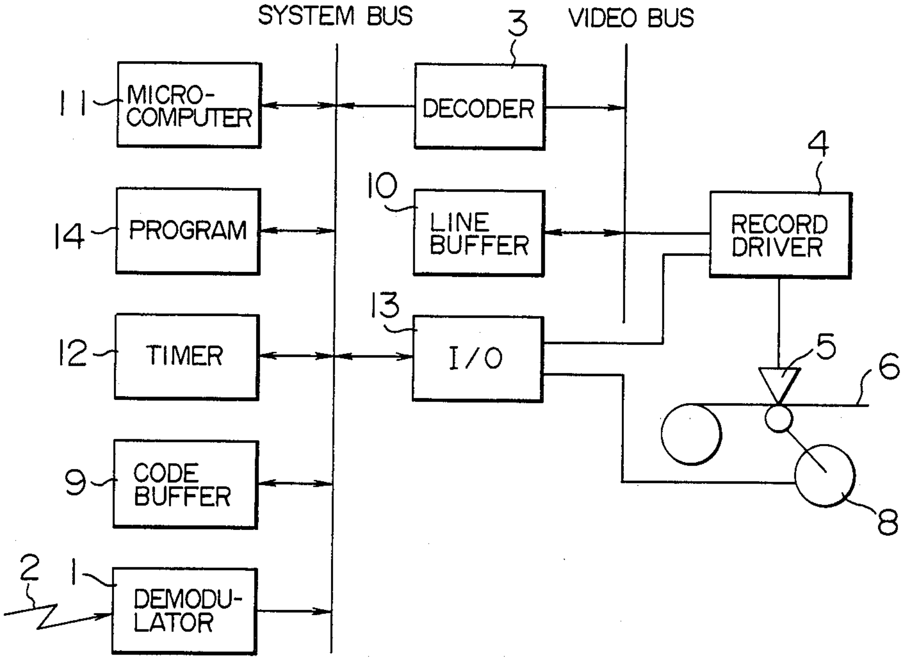
FIG. 12 is a block diagram of the facsimile apparatus shown in FIG. 11.
Figure 14:
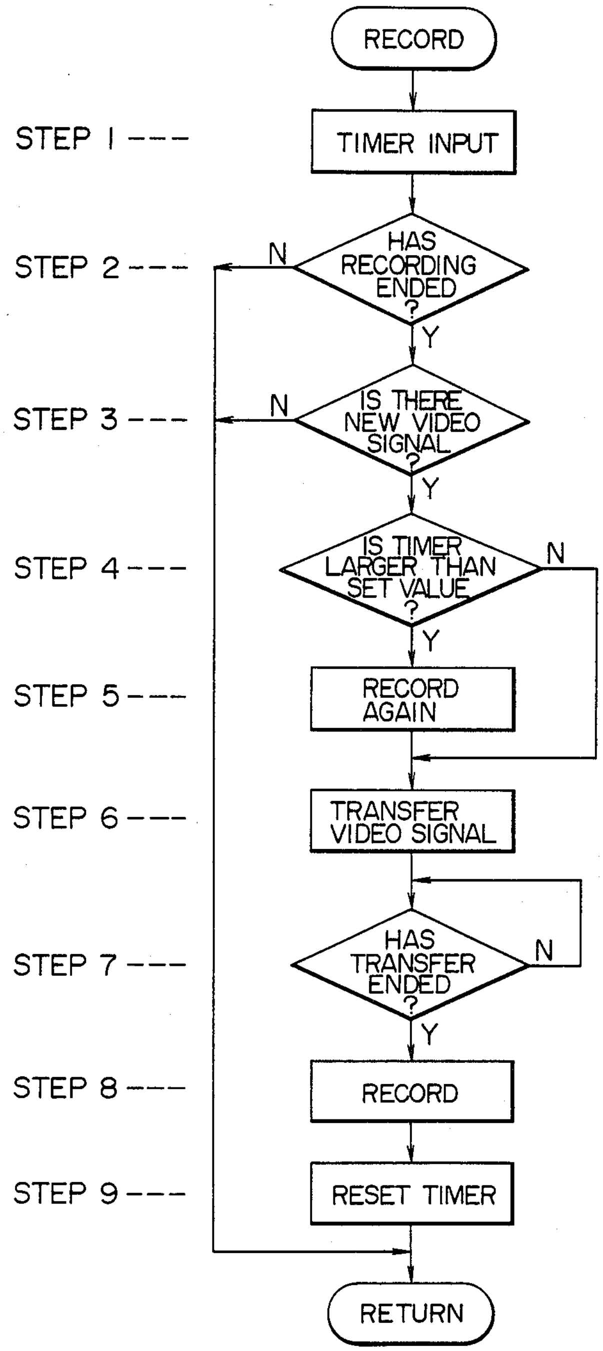
FIG. 14 is a flow chart showing the flow of control in accordance with the control program shown in FIG. 13.

Referring to FIG. 12 which is a block diagram showing the construction of the facsimile apparatus, the received signal 2 is demodulated by the demodulator 1 so as to become MH-coded signal and is stored in a code buffer 9. The MH-coded signal is delivered from the code buffer 9 to the decoder 3 which decodes this signal into video signal. After completion of decoding of the video signal corresponding to one line, a signal from a timer 12 representing the completion of decoding is delivered to a microcomputer 11 which also receives a signal representing the length of time elapsed after the commencement of recording along the preceding line. Thus, the microcomputer judges whether the recording is finished with the preceding line, as well as whether the time length after the commencement of recording of the preceding line is longer than a predetermined period. When the time length elapsed after the commencement of the recording of the preceding line exceeds the predetermined period, the microcomputer 11 outputs, through an interface 13, a recording pulse so as to drive the recording driver 4 again thereby to effect duplicate printing of the video signal corresponding to the preceding recording line. The microcomputer 11 then delivers a transferring instruction to the decoder 3 so that the latter transfers to the recording driver 4 the video signal corresponding to the next line of recording out of the information data stored in the line buffer 10. When the transfer is completed, the decoder 3 inform the microcomputer 11 of the completion of the transfer. Upon receipt of the signal representing the completion of the transfer, the microcomputer 11 delivers a pulse to the recording driver 4 through the interface 13 and, after elapse of a period corresponding to the delay time $t_0$, a driving pulse is delivered to the pulse motor 8. The timer 12 is reset simultaneously with the output of the driving pulse.

The series of operation described hereinabove is repeated until the completion of recording is finished.

Figure 13:
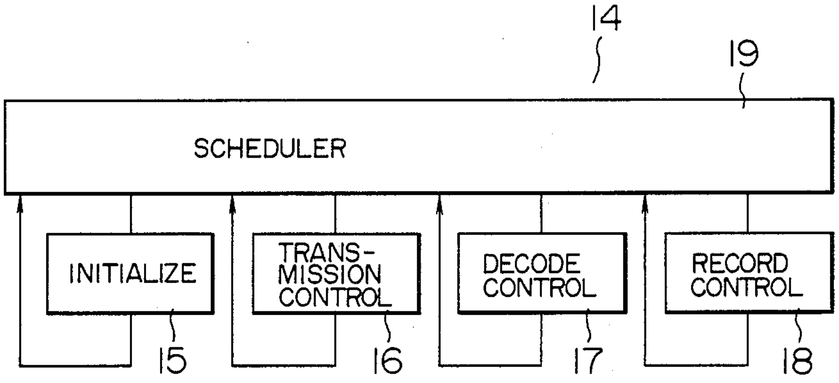
FIG. 13 is a block diagram of a control program for controlling the facsimile apparatus shown in FIG. 12.
Figure 9:
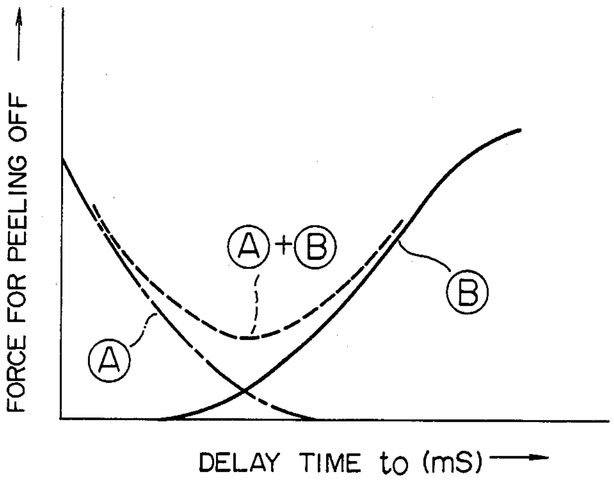
FIG. 9 is a diagram showing the relationship between the paper separation force and time lag $t_0$.

FIG. 13 is a block diagram of a control program in accordance with which the microcomputer 11 controls the whole system. The control program has four tasks: namely, initializing task 15, communication control task 16, decoding control task 17 and recording control task 18. The start and finish of these tasks are controlled by a scheduler 19. An example of the flow of the control explained above will be described hereinunder with reference to FIG. 14.

When the recording control task 18 is started by the scheduler 19, the content of the timer is inputted in Step 1. Then, in a subsequent Step 2, a judgment is conducted as to whether the recording has been finished with the preceding recording line. If the recording has not been finished, the process returns to the scheduler 19. However, if the recording has been finished, a judgment is conducted in Step 3 as to whether the line buffer 10 stores video signal corresponding to at least one recording line. If the answer is NO, i.e., if the video signal corresponding to one or more lines has not been stored in the line buffer 10, the process returns to the scheduler 19. However, if the answer is YES, i.e., if the quantity of the video signal stored in the line buffer 10 exceeds that for one recording line, the process proceeds to Step 4 in which a judgment is conducted, using the signal from the counter 12, as to whether the time elapsed from the commencement of the recording of the preceding line exceeds the set time. If the content of the timer 12 is still below the level corresponding to the set time, the process proceeds to Step 6, whereas, if not, the process proceeds to Step 5. In Step 5, printing pulse is delivered to the recording driver 4, thereby effecting the duplicate recording. In Step 6, however, a transferring instruction is given to the decoder 3 so that new video information corresponding to one recording line is transferred from the line buffer 10 to the recording driver 4. In Step 7, completion of the transfer is confirmed and, in Step 8, a printing pulse and a driving pulse are delivered to the recording driver 4 and the pulse motor 8, respectively, thereby recording the video information. The process is returned to the scheduler 19, after setting the timer again.

As has been described in detail, according to the present invention, the signal for starting the operation of the paper feed motor is delayed behind the signal for commencing the recording of each line, the amount of delay being selected to fall within a region which enables the force required for separating the recording paper sheet from the thermal head to be minimized. This in turn reduces the level of the load imposed on the motor, so as to permit a motor of smaller capacity and lower cost to be used, with the result that not only the noise produced by the motor is reduced but the noise produced by the separation of the recording paper sheet from the thermal head is reduced as well.

The described embodiment of the present invention offers an additional advantage that, when the feed of the recording paper sheet has been suspended for a time longer than a predetermined period, heating pulses are inputted to the heat-generating elements so as to enable the force required for the separation of the recording paper sheet to be reduced, contributing remarkably to the reduction in the noise attributable to the separation of the recording paper sheet. In consequence, the thermal recording device of the invention can operate with noise which is lowered substantially to the level of the noise produced by the paper feeding motor alone. Furthermore, the size and the cost of the paper feeding motor can be remarkably reduced as compared with those of the motor used in the conventional thermal recording device of the kind described.

What is claimed is:

1. A thermal-head type recording device including a thermal head having a multiplicity of heat-generating elements arrayed thereon, a recording paper sheet adapted to be fed in a direction perpendicular to the direction of the array of said heat-generating elements, and a paper feeding motor for intermittently feeding said recording paper sheet in said direction, and wherein a recording operation for each recording line is conducted by dividing a single line of the array of said heat generating elements on said thermal head into a plurality of blocks in a time-dividing manner, comprising: controlling means for causing the timing of a signal for commencing the driving of said paper feeding motor to be delayed by a predetermined period behind the timing of a signal for commencing the recording by said thermal head for each recording line.

2. A thermal-head type recording device as set forth in claim 1, wherein said controlling means include a delay circuit adapted for causing the timing of said signal for commencing the driving of said paper feeding motor to be delayed by 5 to 20 mS behind the timing of said signal for commencing the recording by said thermal head for each recording line.

3. A thermal-head type recording device as set forth in claim 1, wherein said controlling means includes a delay circuit adapted for causing the timing of said signal for commencing the driving of said paper feeding motor to be delayed behind the timing of said signal for commencing the recording by said thermal head for each recording line, by a time length which minimizes the sum of the sticking force caused by the blocks of video information recorded immediately before a line feed of said recording paper and the sticking force caused by the blocks of video signal recorded after completion of the immediately preceding line feed of said recording paper sheet.

4. A thermal-head type recording device including a thermal head having a multiplicity of heat-generating elements arrayed thereon, a recording paper sheet adapted to be fed in a direction perpendicular to the direction of the array of said heat-generating elements, and a paper feeding motor for intermittently feeding said recording paper sheet in said direction, and wherein a recording operation for each recording line is conducted by dividing a single line of the array of said heat generating elements on said thermal head into a plurality of blocks in a time-dividing manner, comprising: controlling means for causing the timing of a signal for commencing the driving of said paper feeding motor to be delayed by a predetermined period behind the timing of a signal for commencing the recording by said thermal head for each recording line, and means for supplying, when the feed off said recording paper sheet has been suspended for a predetermined period after the recording operation of said thermal head by heating pulses supplied thereto, heating pulses to the heat-generating elements which have participated in said recording operation, immediately before the commencement of the feed of said recording paper sheet after the suspension of feed thereof.

5. A thermal-head type recording method in which a recording paper sheet is intermittently fed in a direction perpendicular to the direction of array of a multiplicity of heat-generating elements on a thermal head, and video information is recorded on said recording paper sheet in accordance with heating pulses supplied to said heat-generating elements, and a recording operation for each recording line is conducted by dividing a single line of the array of said heat generating elements on said thermal head into a plurality of blocks in a time-dividing manner, characterized by causing the timing of a signal for commencing the driving of said paper feeding motor to be delayed by a predetermined period behind the timing of the signal for commencing the recording by said thermal head for each recording line.

6. A thermal-head type recording method as set forth in claim 5, wherein the timing of said signal for commencing the driving of said paper feeding motor is delayed by 5 to 20 mS behind the timing of said signal for commencing the recording by said thermal head for each recording line.

7. A thermal-head type recording device as set forth in claim 5, wherein the timing of said signal for commencing the driving of said paper feeding motor is delayed behind the timing of said signal for commencing the recording by said thermal head for each recording line, by a time length which minimizes the sum of the sticking force caused by the blocks of video information recorded immediately before a line feed of said recording paper and the sticking force caused by the blocks of video signal recorded after completion of the immediately preceding line feed of said recording paper sheet.

8. A thermal-head type recording method in which a recording paper sheet is fed in a direction perpendicular to the direction of array of a multiplicity of heat-generating elements on a thermal head, and video information is recorded on said recording paper sheet in accordance with heating pulses supplied to said heat-generating elements, and a recording operation for each recording line is conducted by dividing a single line of the array of said heat generating elements on said thermal head into a plurality of blocks in a time-dividing manner, characterized by causing the time for commencing the feeding of said recording paper sheet to be delayed by a predetermined period behind the timing for commencing the recording on said recording paper sheet, and supplying, when the feed of said recording paper sheet has been suspended for a predetermined period after a recording operation on said recording paper sheet, heating pulses to the heat-generating elements which have participated in said recording operation, immediately before the commencement of feed of said recording paper sheet after the suspension of feed thereof.

* * * * *